(No Model.)　　　　　　D. F. CRANE.　　　　2 Sheets—Sheet 1.
TIME CHART.

No. 379,862.　　　　　　　Patented Mar. 20, 1888.

(No Model.) 2 Sheets—Sheet 2.

D. F. CRANE.
TIME CHART.

No. 379,862. Patented Mar. 20, 1888.

Witnesses, Inventor,
D. F. Crane,
by C. A. Snow & Co.
Attorneys.

UNITED STATES PATENT OFFICE.

DOMINIC F. CRANE, OF WHITE MILLS, KENTUCKY.

TIME-CHART.

SPECIFICATION forming part of Letters Patent No. 379,862, dated March 20, 1888.

Application filed June 6, 1887. Serial No. 240,490. (No model.)

*To all whom it may concern:*

Be it known that I, DOMINIC F. CRANE, a citizen of the United States of America, residing at White Mills, in the county of Hardin and State of Kentucky, have invented certain new and useful Improvements in Universal Comparative Time-Charts, of which the following is a description.

The invention relates to improvements in time-charts, being intended for use in school and other atlases, and having for its object to demonstrate quickly and readily certain geographical facts of interest and importance; and it consists in the construction and novel combination of parts, hereinafter described, and pointed out in the appended claims.

Figure 1:
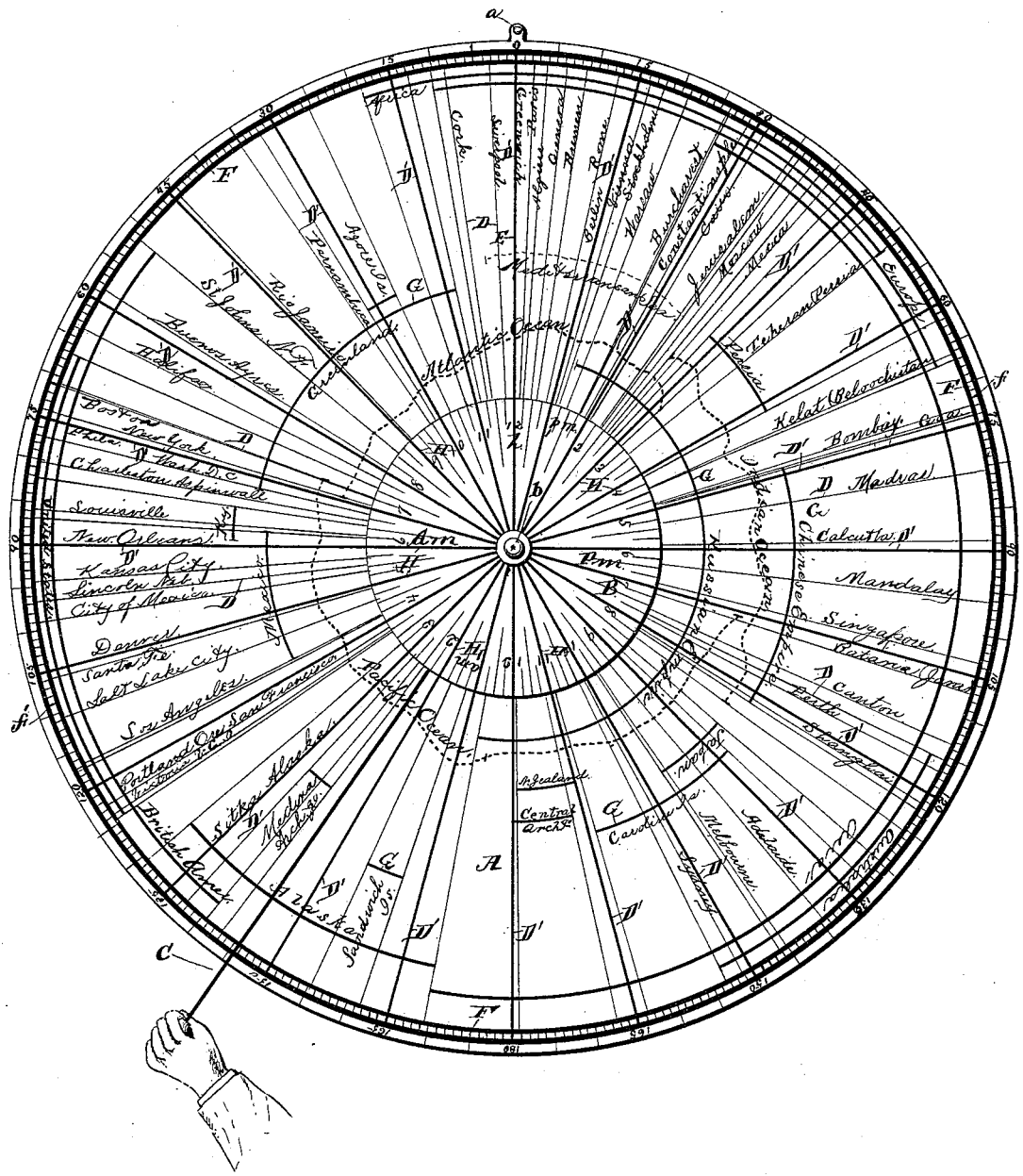
Figure 2:
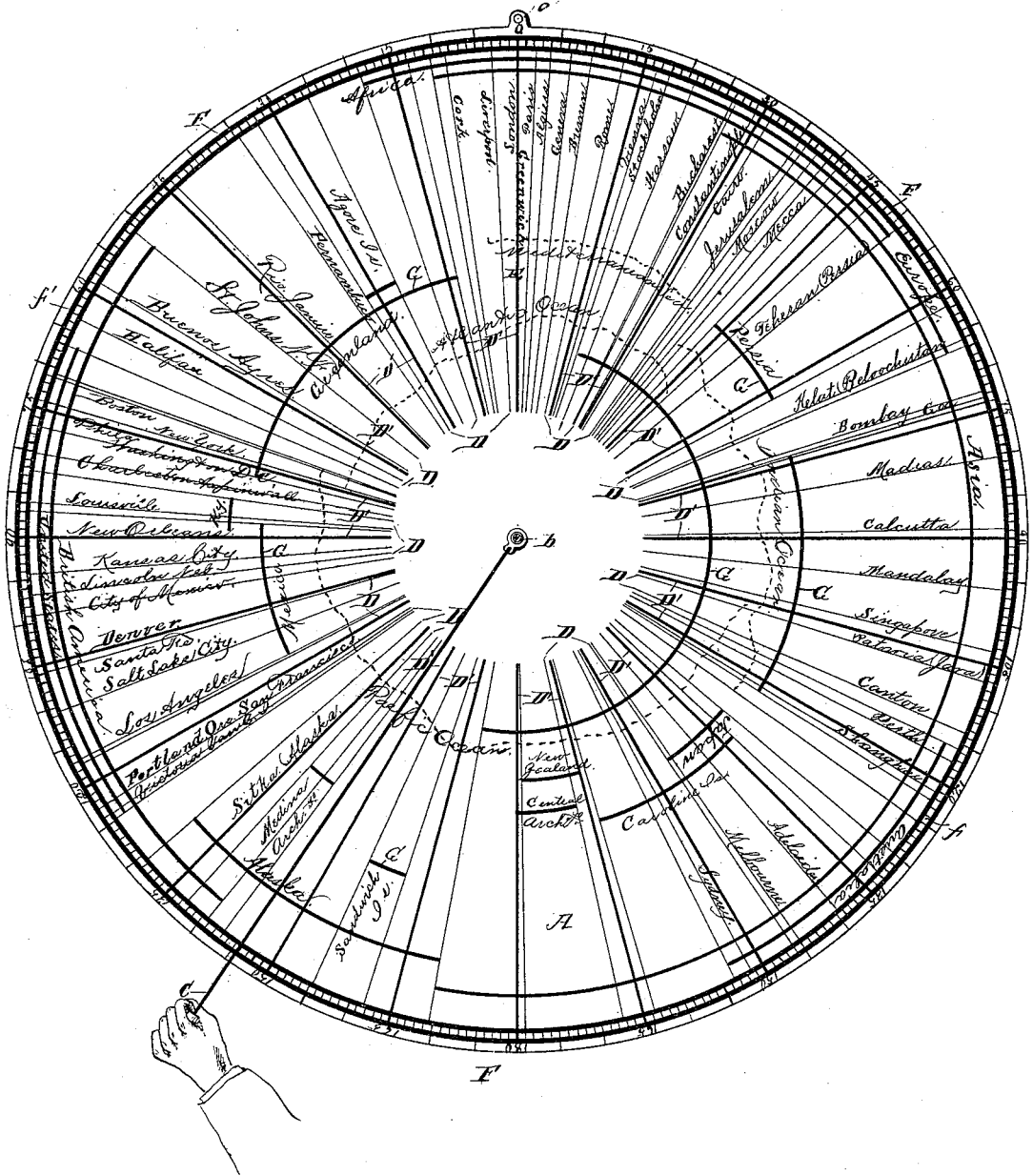

In the accompanying drawings, Figure 1 is a plan view of the device. Fig. 2 is a plan view of the chart-disk with the dial-disk detached, but with the cord attached to the arbor.

The device consists, essentially, of three parts only, which are the chart-disk A, the dial-disk B, pivoted through its center on the central arbor, $b$, of the chart-disk, and the cord C, having its inner end attached by a loop or ring to said arbor, preferably between the chart-disk and dial-disk, but, if desired, outside of the latter.

The chart-disk is made of any suitable material and size, has its face preferably whitened, and may be hung to the wall by a hook or staple, $a$, or attached within an atlas similarly to a leaf.

Upon the face of the chart-disk are marked the radial lines D D, which extend from below the periphery of the dial-disk to the edge of the chart-disk, and the disk is graduated adjoining its edge from the highest radial line, or the one below the hook $a$, into one hundred and eighty degrees in each direction, as shown at $f\ f'$. The radial lines represent circles of longitude as they would appear on the polar projection of a globe representing the earth, the said lines being each the meridian of the place marked radially adjacent thereto, and the highest line, E, being the meridian of Greenwich. The divisions $f$ of the graduated scale F, running from the right of the Greenwich meridian, are degrees of east longitude, and the left divisions, $f'$, are degrees of west longitude. From the Greenwich meridian, at every fifteen degrees, the radial lines are made heavier, as at D', thus clearly indicating upon the chart-disk the distances the sun travels each hour. The degrees $f\ f'$ also are intended to be divided into minutes, though the views are too small, owing to the restriction of size thereof, to clearly show the same thereon.

Each country, ocean, sea, and properly large body of land or water has its name marked concentrically on the chart-disk adjacent to a concentric line, G, the ends of which are on the radial lines extending inward from the degrees east or west of the scale F, that indicate the farthest points east and west of said body of land or water. This is plainly shown on the chart-disk, those countries that have the same circles of longitude passing through them having the east and west lines G drawn at different positions outward on said disk, so as not to interfere with each other.

The dial-disk B is of the comparative size shown in the drawings, and is provided with the equidistant radial lines H H, twenty-four in number, and marked to the right from the line $h$, which is marked "Noon," 1, 2, 3, &c., up to 12, and then, again, 1, 2, 3, &c., up to 11, which is next adjacent on the left to the noon-mark. The radial marks are hour-marks, which register with the hour-marks fifteen degrees apart on the chart-disks when the noon-mark is moved to register with the meridian of Greenwich.

It is intended that the edge of the dial-disk should be marked with half-hours, quarter-hours, and minutes between the hour-lines; but the restriction of space prevents it being shown clearly.

Opposite to the noon-mark $h$ is the line marked "12" and "Midnight," and the hour-lines on the side of "Noon," between 5 and 6 on the left side and 6 and 7 on the right side, are preferably red, while on the "Midnight" side between said number they are preferably black. The device, however, will not give the true whole time of day or night, except at the equinoxes, though the red and black marks will indicate comparatively the extent of day and night, respectively.

The chart-disk gives, without the use of the dial-disk, the longitude of any place marked thereon east or west from Greenwich.

To find how many hours and parts thereof the sun takes to travel from one place to another place, the noon-line of the dial-disk is set to register with the radial line D, passing through the second place. Then the hour-line that registers with the radial line passing through the first place will be marked with the true time of passage. To show the time at a second place at a determined hour at a first place, move the mark of said hour to register with the radial line D of said first place, and the hour-mark registering with the radial line of the second place will give the hour there. To show how long the sun takes to travel over a certain body of land or water, place the noon-mark h to register with the radial line D, passing through the west end of the line G of said body, and the hour-line registering with the radial line passing the east end of said line G will give the true time of passage. To find at what place it is noon, midnight, or any other hour, at a given time at a given place, put the hour-line of said hour to register with the radial line of said place, the lines for noon, midnight, or other hours will indicate the mentioned times in the described manner. To find what is the time at a place not on the chart-disk, when it is noon or other hour at a second place, find on a map the longitude of the place, stretch the cord C through said degree of longitude and move the noon or other hour line to register with the radial line of the second place, and the hour-line registering with the cord will give the desired hour of the day. In this way a number of interesting and useful geographical facts can be quickly and with ease ascertained, and the device will be found very important in instructing children and for school use.

It is plain that the longitude from Greenwich is given by the chart-disk alone, and by a slight addition or subtraction the difference of longitude of two places can be found.

The Greenwich meridian is used because common to all English-speaking nations; but it is evident that any other meridian could be substituted.

Having thus described my invention, I claim—

1. In a time-chart, the combination, with the chart-disk A, provided with the radial lines D D, indicating circles of longitude on a polar projection of the earth, the scale F, representing degrees of longitude east and west from the "Greenwich" meridian, and the concentric lines G of bodies of land or water, the names of the corresponding places being marked adjacent to said radial and concentric lines, of the dial-disk B, pivoted centrally on the central arbor of the chart-disk and provided with the equidistant radial hour-lines and intervening lines and marked adjacent to its edge, and the corresponding lines from the "Noon" line to the right 1, 2, 3, and to the 12 line, which is also marked "Midnight," and thence to 11, which is the next line adjoining the noon-line on the left, the lines intervening between the proper hour-lines being also properly marked, substantially as specified.

2. In a time-chart, the combination of the chart-disk provided with the properly-named radial meridian lines D, the concentric longitude-lines G, for bodies of land and water, and the graduated scale F adjacent to its edge, the dial-disk pivoted centrally on the chart-disk and provided with the numbered twenty-four radial hour-lines H, and intervening lines, and having the words "Noon" and "Midnight" inscribed at proper points thereon, and the cord C, having its inner end attached by a loop or ring to the arbor b between the chart-disk and dial-disk, substantially as specified.

Witness the signature of said DOMINIC F. CRANE, at Louisville, Kentucky, this 3d day of March, 1887.

DOMINIC F. CRANE.

Witnesses:
MATT O'DOHERTY,
C. M. BLAKE.